July 29, 1930.  J. L. FORD  1,771,532
DISPLAY AND ILLUMINATED TRANSPARENCY
Filed June 8, 1929
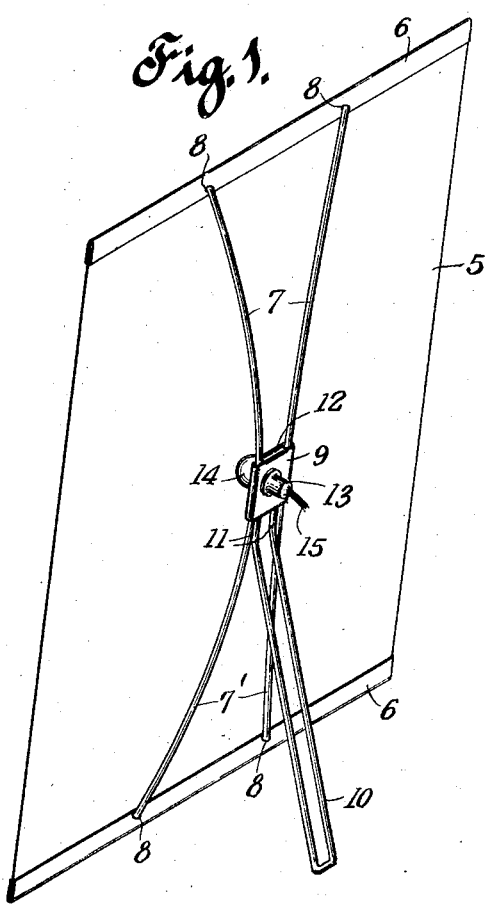
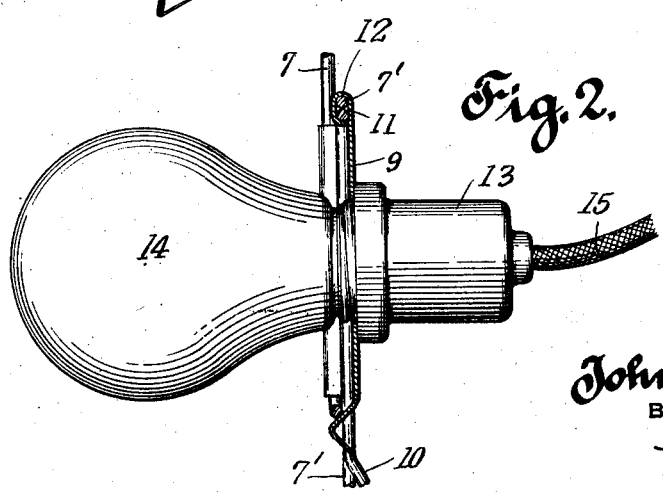
INVENTOR
John L. Ford
BY Wilbur M. Stone
his ATTORNEY Patented July 29, 1930

1,771,532

UNITED STATES PATENT OFFICE

JOHN L. FORD, OF KEW GARDENS, NEW YORK, ASSIGNOR TO SNYDER & BLACK, INC., OF NEW YORK, N. Y., A CORPORATION OF NEW YORK

DISPLAY AND ILLUMINATED TRANSPARENCY

Application filed June 8, 1929. Serial No. 369,410.

This invention relates to displaying and illuminated transparencies and provides means for holding a transparency tensely extended and for holding a source of illumination at a proper distance behind the transparency.

The invention is preferably applied to the knock down type of display device and is adapted to assure the positioning of the lamp or other source of lighting at a predetermined position in relation to the matter borne by the transparency when this is set up by the user.

In the accompanying drawing one practicable embodiment of my invention is illustrated in which drawing, Figure 1 shows a rear view of a transparency held in display position by a form of my invention which is shown holding a lamp at about the center of the transparency and out of contact with it, and Fig. 2 is an enlarged longitudinal section through the lamp holder, a lamp being shown in elevation.

The poster display is intended to represent a transparency 5 having at its respective ends rigid binding material 6, preferably tin, bent over the ends of the transparency and clamped in position. The holding device is shown comprised of a pair of upper rods 7—7 and a pair of lower rods 7'—7' which are generally formed of wire of suitable strength and resiliency for that purpose. The lower parts of the upper rods 7—7 terminate in a cross piece enclosed in a head formed at the lower edge of sheet 9, and the upper parts of the rods terminate in a similar cross piece formed at the upper edge of sheet 9. The combined length of a rod 7 and a rod 7' is greater than the length of the transparency 5 so that when the ends of the rods are mounted in suitable sockets 8 formed in the binding members 6, the rods will hold the transparency taut and they will bow away from the rear surface of the transparency 5.

The rods 7 also bow toward each other at the center where they are bonded together by a lamp carrier 9. This lamp carrier also supports a leg or strut member 10 for supporting the entire structure as an easel display.

The lamp holder 9 is preferably in the form of a sheet of metal bent around the rods 7 and the ends 11 of the leg 10. These ends may be removably inserted in the bends 12. When the device is knocked down, this leg structure is withdrawn.

A lamp socket 13 is shown secured to the rear of the lamp holder 9 into which socket may be screwed some suitable electric lamp 14, the conductor to a source of electricity is shown in the form of cable 15 entering the socket. If desired, the socket may be equipped with some suitable flashing device.

The amount of the outward bowing of the rods 7 is in any particular embodiment of the device sufficient to hold the lamp at the proper distance to the rear face of the transparency. The form of lamp mounting is such that it may readily be placed in position when the device is set up, and as readily removed when knocked down.

I claim:

The combination with a transparent sheet having a sheet metal binding at each end, each such binding having formed in it two sockets widely spaced apart, of resilient rods having their ends demountably inserted in the sockets, said rods being of such a length whereby the sheet is stretched flat and the rods are bowed, a bond of sheet metal engaging the rods and bowing them toward one another, and an electric light socket fixed to said bond.

In witness whereof, I hereby affix my signature, this 4th day of June, 1929.

JOHN L. FORD.